United States Patent [19]

Headrick

[11] Patent Number: 4,651,846
[45] Date of Patent: Mar. 24, 1987

[54] REAR DRIVE INCHING CONTROL FOR A FOUR WHEEL DRIVE VEHICLE

[75] Inventor: C. Ronald Headrick, New Philadelphia, Ohio

[73] Assignee: The Gradall Company, New Philadelphia, Ohio

[21] Appl. No.: 793,076

[22] Filed: Oct. 31, 1985

[51] Int. Cl.[4] .................... B60K 17/34; B60K 17/10; B60K 25/04
[52] U.S. Cl. .................... 180/243; 180/53.2; 180/53.4; 180/305; 180/306; 60/436; 74/733; 192/4 A
[58] Field of Search .................... 180/243, 53.2, 53.4, 180/305, 306, 308; 74/733, 732; 60/436; 192/4 A, 3

[56] References Cited

U.S. PATENT DOCUMENTS

| | | | |
|---|---|---|---|
| 2,883,015 | 4/1959 | Schroeder | 192/4 A |
| 3,240,371 | 3/1966 | Conrad | 180/53.2 X |
| 3,288,256 | 11/1966 | Dandro | 74/478.5 X |
| 3,339,363 | 9/1967 | Quayle | 180/53.2 X |
| 3,702,648 | 11/1972 | Mori | 192/4 C |
| 3,750,762 | 8/1973 | Eaton | 180/53.2 X |
| 3,779,608 | 12/1973 | Hatcher et al. | 180/53.2 X |
| 3,948,366 | 4/1976 | Kitano | 192/4 A |
| 4,006,805 | 2/1977 | Zeller et al. | 192/4 A |
| 4,132,132 | 1/1979 | Shaffer | 74/732 |
| 4,271,723 | 1/1981 | Shaffer | 180/53.2 X |

Primary Examiner—John A. Pekar

[57] ABSTRACT

An inching system for use in a vehicle for performing work which permits the vehicle to be moved at reduced speeds while maintaining sufficient engine speed, and therefore, sufficient hydraulic fluid flow and pressure for actuating the work-performing apparatus. The inching system includes a control valve for controlling the amount of hydraulic fluid which a forward-reverse valve is able to direct to the rear drive means, an orifice through which hydraulic fluid flows from a source of hydraulic fluid to the control valve to restrict the flow of fluid to a level below that of the flow to the work-performing apparatus, and a variable inching valve for metering hydraulic fluid from the control valve so that fluid pressure available to the forward-reverse valve, and in turn, to the rear drive means, is progressively reduced. A pedal is provided in the cab of the vehicle to selectively actuate the variable inching valve to effect inching control. Depression of the pedal initially disconnects the front drive means so that only the rear drive means is operative, then opens the variable inching valve to progressively drain fluid from the control valve, then finally brakes the vehicle.

14 Claims, 2 Drawing Figures

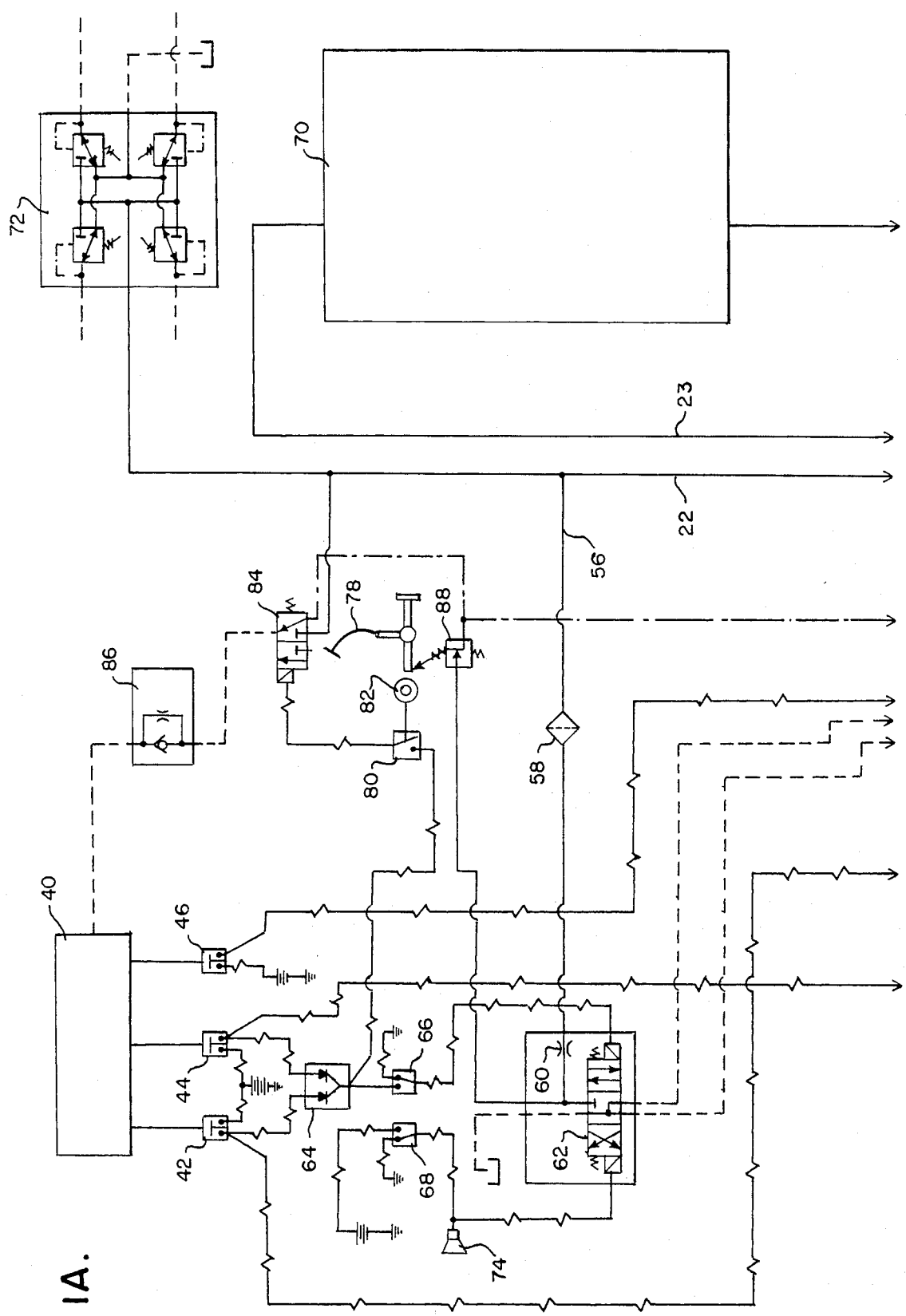
Fig. IA.

- Legend -
Pressure & Return
Pilot
Drain
Electrical

REAR DRIVE INCHING CONTROL FOR A FOUR WHEEL DRIVE VEHICLE

BACKGROUND OF THE INVENTION

1. Field of the Invention:

The present invention relates to inching control systems, and more particularly, to a rear drive inching control system.

2. Description of the Prior Art:

Rough terrain vehicles for performing work functions such as forklifts, must maintain a high engine speed to perform the intended work function while having a precise low speed drive control for slow travel. One means of achieving such low speed drive control is by built-in modulation of the drive line transmission.

An inching system used in a conventional rough terrain vehicle with mechanical front drive and hydraulic rear drive employs a complicated linkage system to control a variable potentiometer which in turn controls a torque motor actuated pilot valve. The pilot valve outputs a differential pressure proportional to the input current. The output pressure controls a forward-reverse valve which in turn controls the drive system. Inching systems of this kind are difficult to maintain and, due to hydraulic fluid leakage through the pilot valve, experience control problems at low engine speeds.

A variety of inching control systems have been proposed. For example, Zeller et al. U.S. Pat. No. 4,006,805 describes an inching control system for a forklift or similar vehicle. The system includes a pump, a directional control valve, forward/reverse clutches, an inching valve, a narrowed orifice and a braking system. The pump draws fluid from a reservoir to supply the directional control valve. Depending on the operator-selected positioning of the directional control valve, fluid is directed toward the forward or reverse clutch. Intermediate the pump and the directional control valve is a bypass inching valve and a narrowed orifice. The fluid normally flows through the inching valve to the directional control valve, bypassing the orifice. When the brake is depressed slightly, the inching valve begins to close, restricting flow therethrough. Fluid then reaches the directional control valve through the narrowed orifice, decreasing the pressure to the forward or reverse clutch. Further depression of the brake will stop the vehicle.

Kitano et al. U.S. Pat. No. 3,948,366 describes inching and regulating valves for clutches in industrial vehicles. The inching valve, which is disposed within the fluid circuit connecting a pump to a fluid pressure type clutch, controls the degree to which the clutch is actuated. When the brake is depressed, fluid pressure from the regulator valve flows to the inching valve to be exhausted. A lower pressure is therefore available to a forward/reverse valve than the pressure between the pump and the regulator valve. A lower pressure is thereby exerted against the clutch so that the transmission is moved from a semi-clutched to a declutched condition.

Conrad U.S. Pat. No. 3,240,371 describes an inching control system in which an inching control valve is fluidly connected to forward/reverse clutches. Fluid power can be transferred to boom actuators at any desired speed while the vehicle can be inched as desired due to the clutching control of the inching valve. The inching valve is actuated when the boom is raised by means of a valve operatively connected to a carriage.

Quayle U.S. Pat. No. 3,339,363 discloses a mechanism for permitting high speed operation of an engine in an industrial vehicle for performing work functions, while controlling the fluid available to a hydraulic motor for achieving a slow inching speed. By depressing an inching pedal a control valve in a valve block moves into a position for diverting fluid from the motor and for preventing fluid from leaving the motor, thereby achieving a braking action to control the speed of the vehicle. At the same time, an accelerator can be depressed to speed the engine to provide hydraulic fluid for the desired function.

Additional speed reduction systems are shown by Schroeder U.S. Pat. No. 2,883,015; Dandro U.S. Pat. No. 3,288,256; Eaton U.S. Pat. No. 3,750,762; Mori U.S. Pat. No. 3,702,648 and Hatcher U.S. Pat. No. 3,779,608.

The prior art inching systems are adapted for use with mechanical drive means and are controlled by conventional torque converter combination transmissions with clutches. It is believed that the steering for inching travel can be more precise and better controlled when a hydraulic rear axle steering system is employed. In drive systems having a mechanically actuated front drive means and a hydraulically actuated rear drive means, the prior art inching systems are not suitable.

It is an object of the present invention to provide a rear drive inching system for use in vehicles having mechanically actuated front drive means and hydraulically actuated rear drive means. It is a further object of the present invention to provide an inching system for such a vehicle which offers consistant and precise operator control throughout the range of engine speeds and which has fewer working parts to permit lower costs and easier maintenance.

SUMMARY OF THE INVENTION

The present invention provides an inching system for use in a vehicle having mechanically actuated front drive means including a main drive transmission, hydraulically actuated rear drive means, brake means, hydraulically actuated apparatus for performing work functions, a source of hydraulic fluid and conduit means for delivering hydraulic fluid. The inching system permits the vehicle to be moved at reduced speeds while maintaining sufficient hydraulic flow and pressure for actuating the work-performing apparatus.

The inching system includes means for controlling the fluid pressure to the rear drive means, means for restricting the flow of hydraulic fluid from the source of fluid to the controlling means to a level below that of the flow to the apparatus, means for metering hydraulic fluid from the controlling means so that fluid pressure available to the rear drive means is progressively reduced, and means for selectively actuating the fluid metering means.

The actuating means, preferably at least one pedal in the cab of the vehicle, is movable from a first position in which the front and rear drive means are operative to a second position in which the main drive transmission is placed in neutral to disconnect the front drive means so that the rear drive means alone is operative. The actuating means is then movable through a third position in which the fluid metering means is actuated to drain fluid from the controlling means at a progressively increasing rate, preferably in proportion to the movement of the actuating means through the third position. Finally, the actuating means is movable to a fourth position in which the rear drive means is inoperative and the brake means alone are operative. The brake means are preferably actuated toward the end of the third position to provide a smooth transition from the inching movement to braking.

The vehicle may include means for actuating the brake means independently of the means for actuating the fluid metering means. In yet another embodiment, a second means for actuating the fluid metering means may be provided which is movable from the first position to at least the second or third positions.

The controlling means includes a forward-reverse valve fluidly connected to the rear drive means for delivering hydraulic fluid to the rear drive means and for controlling the direction of travel of the vehicle and a control valve fluidly connected to the forward-reverse valve for controlling the amount of hydraulic fluid the forward-reverse valve is able to direct to the rear drive means. The restricting means is an orifice through which hydraulic fluid must flow from the source of fluid to the control valve. The orifice has a flow path narrower than that of the conduit means and is positioned remotely from the flow of hydraulic fluid from the source to the apparatus.

The metering means is a variable inching valve having a spool which rotates in response to the movement of the actuating means through the third position. The rotation of the spool provides an increasingly larger passage through which hydraulic fluid is drained from the controlling means at a progressively increasing rate to progressively reduce the fluid pressure available to the rear drive means. The restricted flow to the control valve and the progressive drainage of hydraulic fluid from the control valve reduce the pressure available to the rear drive means so that the vehicle can be moved slowly without interfering with the fluid flow to the work-performing apparatus. The engine speed can be relatively high to pump sufficient hydraulic fluid to the work-performing apparatus without pumping high pressure fluid to the rear drive means.

BRIEF DESCRIPTION OF THE DRAWINGS

The present invention can be better understood by reference to the drawings in which:

FIG. 1A is a schematic diagram of a portion of the preferred embodiment of the inching system of the present invention incorporated in portions of the hydraulic flow path of the vehicle.

DETAILED DESCRIPTION OF THE PREFERRED EMBODIMENT

Figure 1B:
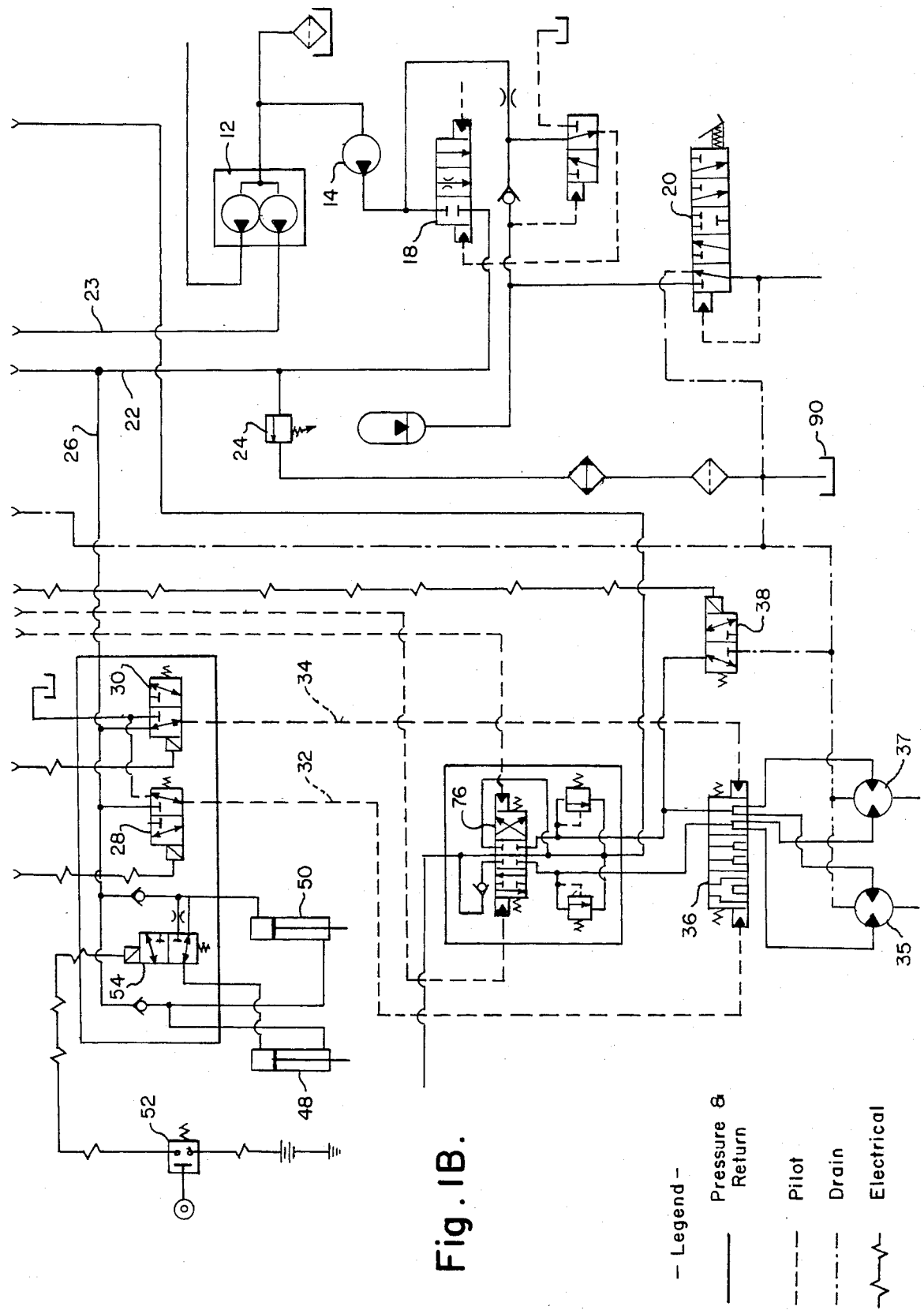
FIG. 1B is a continuation of the schematic diagram of FIG. 1A showing additional portions of the inching system and the vehicle hydraulics.

FIGS. 1A and 1B schematically illustrate the inching system of the present invention as incorporated into relevant portions of the hydraulic system of a vehicle. The present invention is particularly suited for use with a vehicle for performing work functions, such as forklifts or other material handling vehicles. The vehicle for which the inching system is preferred is one having a mechanically actuated front drive system and a hydraulically actuated rear drive system. The work-performing apparatus are also hydraulically actuated. The components illustrated schematically in FIGS. 1A and 1B may be any suitable known valves, electrical switches, pumps, motors or other components which will perform the functions required by the inching system of the present invention.

FIG. 1B illustrates the main pump 12 and pilot pump 14. An accumulator 16 and accumulator charging valve 18 are shown. The system acts to insure that the accumulator 16 is charged so that adequate pressure is available to the brake system 20. For obvious safety considerations, priority is given to the brake system 20. Having achieved that, the accumulator charging valve 18 shifts to the left (as viewed in the schematic illustrations of FIGS. 1A and 1B) to permit the flow of hydraulic fluid from pump 14 through conduit 22.

A relief valve 24 positioned along conduit 22 is set, in the preferred embodiment, at 400 psi. When that pressure level is achieved, relief valve 24 opens. The designations "left" and "right" as used herein refer to the position of items on the FIGS. 1A and 1B and are used for purposes of discussion only. Those skilled in the art will recognize that actual positions can be reversed.

Conduit 23 directs hydraulic fluid from main pump 12 to a main apparatus control valve means for controlling the work-performing apparatus, shown generally at 70. Any suitable known work-performing apparatus and main valve means for controlling such apparatus can be employed in a vehicle having the inching system of the present invention. Conduit 22 directs hydraulic fluid from the pilot pump 14 to any suitable operator-controlled means 72, such as a joystick, for controlling the main apparatus control valve means 70. The operator-controlled means 72 directs pilot pressure to the main apparatus control valve means 72.

Conduit 22 branches to conduit 26 to direct hydraulic fluid to series-parallel control valves 28 and 30. The series-parallel control valves, 28 and 30, direct pilot pressure along lines 32 and 34 to either the left or right side, respectively, of the series-parallel valve 36. The series-parallel control valves, 28 and 30, are activated electronically when the main drive transmission 40, shown in FIG. 1A, is shifted to either first gear 42 or second gear 44. Shifting to first gear 42 sends an electronic signal to series-parallel control valve 30 which then directs pilot pressure along line 34 to the right side of the series-parallel valve 36. The valve spool is shifted to divert the flow of hydraulic fluid to each rear drive motor, 35 and 37, equally (parallel flow). Shifting to second gear 44 sends an electronic signal to series-parallel control valve 28 which then directs pilot pressure along line 32 to the left side of the series-parallel valve 36. The flow of hydraulic fluid is routed in series from drive motor 35 to drive motor 37 to double the motor speed in second gear.

Shifting to third gear 46 sends an electronic signal to cavitation solenoid valve 38.

Conduit 26 also directs hydraulic fluid to stabilizing cylinders 48 and 50 which relate to the function of the work-performing apparatus and will not be discussed in detail herein. A switch 52 associated with the work-performing apparatus sends an electronic signal to a solenoid valve 54 to control the delivery of hydraulic fluid to the stabilizing cylinders 48 and 50.

Conduit 22 branches to conduit 56 where the hydraulic fluid is directed through filtration strainer 58, and orifice 60 to a directional control solenoid valve 62. Orifice 60 is, in the preferred embodiment, about 0.027 inches in diameter, but may vary depending on the requirements of the particular hydraulic system. In all cases, the flow path through orifice 60 is narrower than the flow path through the system conduits in general, and specifically through conduits 22 and 23 which direct hydraulic fluid to the main apparatus control valve means 70 and the operator controlled means 72 for controlling the main apparatus control valve means 70.

Orifice 60 restricts the flow of hydraulic fluid from the pilot pump 14 to the directional control solenoid valve 62 to a level below that of the flow to the main apparatus control valve means 70 or the associated operator controlled means 72. As shown in FIG. 1A, orifice 60 is positioned intermediate pump 14 and directional control solenoid valve 62 but remote from the flow of hydraulic fluid from the pumps 12, 14 to the main apparatus control valve means 70 and the operator controlled means 72. Orifice 60 is a fixed orifice so that the flow to directional control solenoid valve 62 will always be restricted relative to the flow through the system conduits to other components.

Directional control solenoid valve 62 is operative in first, second or third gear when the front drive transmission is placed in reverse and in first or second gear when the front drive transmission is placed in forward. When either first or second gear is selected, an electrical signal passes through a diode 64 and a forward drive switch 66 to the right side of directional control solenoid valve 62. When the vehicle is placed in reverse, the reverse switch 68 sends an electrical signal to the left side of directional control solenoid valve 62. For safety considerations, a back-up alarm 74 is preferably also sounded when the vehicle is in reverse.

The forward and reverse switches, 66 and 68, control the direction of travel by diverting pilot pressure from the appropriate port of the directional control solenoid valve 62 to the forward-reverse valve 76 (see FIG. 1B) in the appropriate direction. The direction of flow of hydraulic fluid to the series-parallel valve 36 is changed as needed to coordinate the rear drive with the front drive.

A fine inch valve 88 is fluidly connected to the directional control solenoid valve 62 to selectively drain hydraulic fluid from valve 62 so that the flow available to the rear drive motors 35 and 37 through the forward-reverse valve 76 is progressively reduced. The fine inch valve 88 is selectively actuated by the operator of the vehicle by depressing brake pedal 78 in the cab of the vehicle. When the vehicle is in first or second gear, an electrical signal passes through diode 64 to a transmission disconnect switch 80. When the pedal 78 is depressed, it contacts and moves a roller contact switch 82 to close the circuit in the transmission disconnect switch 80. The electrical signal from the diode 64 is then passed to the low torque inching solenoid valve 84. Pilot pressure is then directed through the orifice check valve 86, then to the transmission 40 to disconnect the main drive transmission by throwing it into neutral. Prior to this point, when the pedal 78 is at rest, in a first position, both the rear drive and the front drive systems are operative. Once the main drive transmission is disconnected by moving the pedal 78 to a second position, only the rear drive system is operative for effecting inching control.

Further depression of the pedal 78 moves it through a third position in which the pedal 78 rotates a spool in the variable fine inch valve 88 to open the valve 88 and drain hydraulic fluid from the directional control solenoid valve 62 and pass the fluid to a low pressure tank 90. A passage through the valve 88 becomes increasingly larger as the spool rotates, preferably in proportion to the depression of pedal 78 through the range that constitutes the third position. The increasingly larger passage drains the directional control solenoid valve 62 at an increasingly greater rate.

Due to the metered drainage of fluid from valve 62 through the fine inch valve 88 and the restricted flow to the valve 62 through orifice 60, the fluid pressure to the forward-reverse valve 76 is capable of being modulated or reduced to 0 pressure.

During the movement of pedal 78 through the third position, the brakes preferably become operative to effect a smooth transition from the inching travel to stopping the vehicle. When the pedal 78 is moved into a fourth or final position, the inching travel ceases and the braking system alone is operative. When the pilot pressure to the forward-reverse valve 76 falls below a predetermined level, for example 60 psi in the preferred embodiment, the forward-reverse valve 76 is thrown into neutral. The flow of hydraulic fluid from pump 12 is diverted to the low pressure tank 90. The rear drive motors 35 and 37 are shut off and the brakes alone are operative. In another embodiment, a second pedal is provided in the cab of the vehicle which will permit inching control but which will not actuate the brakes. Alternatively an independent means for operating the brakes may be provided. Finally, two redundant, totally functional pedals for actuating the fine inch valve 88 from its first position through its fourth position may be provided.

The inching control system of the present invention employs the combination of the directional control solenoid valve 62 and the forward-reverse valve 76 to control the fluid pressure to the rear drive motors 35 and 37. The inching system progressively squeezes off the flow of hydraulic fluid to the rear drive motors 35 and 37 by means of the metered drainage through fine inch valve 88 and the restricted flow through orifice 60 to valve 62. The pedal 78 provides a means for selectively actuating the fine inch valve 88 to permit operator control of the modulation and/or reduction of fluid pressure to the rear drive motors 35 and 37.

The inching control system of the present invention can be incorporated into any suitable fluid powered system for operating a vehicle and its work-performing apparatus. While the vehicle hydraulic flow system illustrated in FIGS. 1A and 1B represent the best mode of achieving inching control in a vehicle of the type discussed herein, those skilled in the art will recognize that variations of the relevant vehicle hydraulics and of the types of valves, pumps and electrical switches employed can be made without exceeding the scope of the present invention.

What is claimed is:

1. In a vehicle having mechanically actuated front drive means including a main drive transmission, hydraulically actuated rear drive means, brake means, hydraulically actuated apparatus for performing work functions, a source of hydraulic fluid, and conduit means for delivering hydraulic fluid, an inching system for moving said vehicle at reduced speeds while maintaining sufficient hydraulic fluid flow and pressure for actuating said apparatus, said inching system comprising:

means for controlling the fluid pressure to said rear drive means;

means for restricting the flow of hydraulic fluid from said source to said controlling means to a level below that of the flow to said apparatus;

means for metering hydraulic fluid from said controlling means so that fluid pressure available to said rear drive means is progressively reduced;

means for selectively actuating said fluid metering means, said actuating means being movable from a first position in which said front and rear drive means are operative to a second position in which said main drive transmission is placed in neutral to disconnect said front drive means so that said rear drive means alone is operative, said actuating means then being movable through a third position in which said fluid metering means is actuated to drain fluid from said controlling means at a progressively increasing rate, and said actuating means then being movable to a fourth position in which said rear drive means is inoperative and said brake means are actuated.

2. An inching system as recited in claim 1 wherein said controlling means comprises:

a forward-reverse valve fluidly connected to said rear drive means for delivering hydraulic fluid to said rear drive means and for controlling the direction of travel of said vehicle and a control valve fluidly connected to said forward-reverse valve for controlling the amount of hydraulic fluid said forward-reverse valve is able to direct to said rear drive means.

3. An inching system as recited in claim 2 wherein said restricting means is an orifice through which hydraulic fluid must flow from said source to said control valve, said orifice having a flow path narrower than that of said conduit means and being positioned remotely from the flow of hydraulic fluid from said source to said apparatus.

4. An inching system as recited in claim 1 wherein said metering means is a variable inching valve having a spool which rotates in response to the movement of said actuating means through said third position, the rotation of said spool providing an increasingly larger passage through which hydraulic fluid is drained from said controlling means at a progressively increasing rate to progressively reduce the fluid pressure available to said rear drive means.

5. An inching system as recited in claim 1 wherein said actuating means is at least one pedal in said vehicle which is selectively movable from said first position through said fourth position.

6. An inching system as recited in claim 1 further comprising means for actuating said brake means independently of said means for actuating said fluid metering means.

7. An inching system as recited in claim 1 further comprising a second means for selectively actuating said fluid metering means being movable from said first position through at least said third position.

8. In a vehicle having mechanically actuated front drive means, hydraulically actuated rear drive means, brake means, hydraulically actuated apparatus for performing work functions, a source of hydraulic fluid and conduit means for delivering hydraulic fluid, an inching system for moving said vehicle at reduced speeds while maintaining sufficient hydraulic fluid flow and pressure for actuating said apparatus, said inching system comprising:

a forward-reverse valve fluidly connected to said rear drive means for delivering hydraulic fluid to said rear drive means and for controlling the direction of travel of said vehicle;

a control valve fluidly connected to said forward-reverse valve for controlling the amount of hydraulic fluid delivered from said forward-reverse valve to said rear drive means;

an orifice through which hydraulic fluid must flow from said source to said control valve for restricting the amount of hydraulic fluid delivered to said control valve to a level below the amount of hydraulic fluid delivered to said apparatus;

means for metering hydraulic fluid from said control valve so that fluid pressure from said control valve to said forward-reverse valve is progressively reduced, such reduction in fluid pressure progressively reducing the amount of hydraulic fluid delivered from said forward-reverse valve to said rear drive means; and means for selectively actuating said metering means.

9. In a vehicle having mechanically actuated front drive means including a main drive transmission, hydraulically actuated rear drive means, brake means, hydraulically actuated apparatus for performing work functions, a source of hydraulic fluid and conduit means for delivering hydraulic fluid, an inching system for moving said vehicle at reduced speeds while maintaining sufficient hydraulic fluid flow and pressure for actuating said apparatus, said inching system comprising:

means for controlling the fluid pressure to said rear drive means;

means through which hydraulic fluid must flow from said source to said controlling means for restricting the flow of hydraulic fluid to said controlling means to a level below that of the flow to said apparatus;

a variable inching valve having a passage therethrough for metering hydraulic fluid from said controlling means at a progressively increasing rate to progressively reduce the fluid pressure available to said rear drive means; and means for selectively actuating said variable inching valve, said actuating means being movable from a first position in which said front and rear drive means are operative to a second position in which said main drive transmission is placed in neutral to disconnect said front drive means so that said rear drive means alone is operative, said actuating means then being movable through a third position in which said passage of said variable inching valve becomes increasingly larger to drain hydraulic fluid from said controlling means at said progressively increasing rate and said brake means become operative, and said actuating means then being movable to a fourth position in which the fluid pressure available to said rear drive means is reduced to a level which inactivates said rear drive means so that said brake means alone is operative.

10. An inching system as recited in claim 9 wherein said controlling means comprises:

a forward-reverse valve fluidly connected to said rear drive means for delivering hydraulic fluid to said rear drive means and for controlling the direction of travel of said vehicle and a control valve fluidly connected to said forward-reverse valve for controlling the amount of hydraulic fluid said forward-reverse valve is able to deliver to said rear drive means.

11. An inching system as recited in claim 9 wherein said restricting means is an orifice having a flow path narrower than that of said conduit means and being positioned remotely from the flow of hydraulic fluid from said source to said apparatus.

12. An inching system as recited in claim 9 wherein said actuating means is an operator controlled pedal in said vehicle which is selectively movable from said first position through said fourth position, said pedal being so linked to said variable inching valve that fluid is drained from said controlling means at a progressivly increasing rate in proportion to the movement of said pedal through said third position.

13. An inching system as recited in claim 9 further comprising means for actuating said brake means independently of said means for actuating said fluid metering means.

14. An inching system as recited in claim 9 further comprising a second means for selectively actuating said fluid metering means being movable from said first position through at least said second position.

* * * * *